(12) United States Patent
Takatsuka et al.

(10) Patent No.: US 9,077,043 B2
(45) Date of Patent: Jul. 7, 2015

(54) SECONDARY BATTERY CELL

(75) Inventors: Yuichi Takatsuka, Hitachinaka (JP); Katsunori Suzuki, Nabari (JP); Sho Matsumoto, Hitachinaka (JP); Kenji Nakai, Mito (JP); Tatsuhiko Kawasaki, Hitachinaka (JP); Hirofumi Takahashi, Hitachi (JP); Yoshio Onodera, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 709 days.

(21) Appl. No.: 13/186,617

(22) Filed: Jul. 20, 2011

(65) Prior Publication Data

US 2012/0021276 A1    Jan. 26, 2012

(30) Foreign Application Priority Data

Jul. 20, 2010  (JP) ................................. 2010-163098

(51) Int. Cl.
| | |
|---|---|
| *H01M 2/00* | (2006.01) |
| *H01M 10/052* | (2010.01) |
| *H01M 2/16* | (2006.01) |
| *H01M 2/10* | (2006.01) |

(52) U.S. Cl.
CPC ............ *H01M 10/052* (2013.01); *H01M 2/168* (2013.01); *H01M 2/1094* (2013.01); *Y02E 60/122* (2013.01)

(58) Field of Classification Search
CPC . H01M 2/0275; H01M 2/1094; H01M 2/168; H01M 2300/0097

USPC ................... 429/163, 164, 167, 185, 208, 246
See application file for complete search history.

(56) References Cited

U.S. PATENT DOCUMENTS

| | | | |
|---|---|---|---|
| 2003/0087150 A1* | 5/2003 | Chung .......................... | 429/129 |
| 2009/0202900 A1* | 8/2009 | Kuroda et al. ................ | 429/156 |
| 2009/0246637 A1* | 10/2009 | Taniguchi et al. ............ | 429/246 |
| 2009/0305122 A1* | 12/2009 | Mitani et al. ................... | 429/94 |

FOREIGN PATENT DOCUMENTS

| | | |
|---|---|---|
| JP | 2000-077103 A | 3/2000 |
| JP | 2000-164259 A | 6/2000 |
| JP | 2002-231215 A | 8/2002 |
| JP | 2002-260721 A | 9/2002 |
| JP | 2004-241251 A | 8/2004 |
| JP | 2005-044690 A | 2/2005 |
| JP | 2005-201920 A | 7/2005 |
| JP | 2006-069739 A | 3/2006 |
| JP | 2008-004476 | 1/2008 |
| JP | 2009-087812 A | 4/2009 |

* cited by examiner

*Primary Examiner* — Jonathan G Leong
*Assistant Examiner* — James Erwin
(74) *Attorney, Agent, or Firm* — Baker Botts L.L.P.

(57) ABSTRACT

The present invention is a secondary battery, including: an electrode group that includes a positive electrode and a negative electrode, an electrolyte, and a battery cell container that contains the electrode group and the electrolyte and that is sealed, wherein: an adhesive layer for trapping foreign matter present inside the battery cell container is disposed in the battery cell container by exposing at least part of the adhesive layer so as to allow the adhesive layer to come into contact with the electrolyte.

17 Claims, 10 Drawing Sheets

SECONDARY BATTERY CELL

INCORPORATION BY REFERENCE

The disclosure of the following priority application is herein incorporated by reference: Japanese Patent Application No. 2010-163098 filed Jul. 20, 2010

BACKGROUND OF THE INVENTION

1. Field of the Invention

The present invention relates to a secondary battery cell

2. Description of Related Art

A cylindrical secondary battery cell, a typical example of which is a lithium secondary battery cell, includes an electrode group made up with a positive electrode with a positive electrode mixture layer formed thereupon and a negative electrode with a negative electrode mixture layer formed thereupon, wound around a winding core via a separator. The layer of positive electrode mixture is formed on both surfaces of a positive electrode sheet. In the lateral border area close to one side edge extending along the length of the positive electrode sheet, no positive electrode mixture layer is formed, thus a positive electrode mixture untreated portion is formed.

Positive leads normally referred to as tabs, to be used when welding the positive electrode to a positive electrode current collecting member are formed at the positive electrode mixture untreated portion, as integrated parts of the positive electrode sheet through a cutting process or the like. Likewise, the negative electrode mixture layer is formed at both surfaces of a negative electrode sheet on the negative electrode side, and negative leads to be welded onto a negative electrode current collecting member, are formed as integrated parts of the negative electrode sheet at a negative electrode mixture untreated portion located in the lateral border area close to one side edge of the negative electrode sheet extending along the length of the negative electrode sheet, through a cutting process or the like.

The positive electrode and the negative electrode in the electrode group may become short-circuited, since for instance, the burrs or the like, which may result from forming the positive leads or the negative leads through the cutting process, break through the separator. Such spot short-circuiting of the positive electrode and the negative electrode will result in a failure to achieve the required voltage, leading to poorer battery cell performance.

A structure known in the related art addresses this issue by folding back an adjacent separator so as to cover one side edge extending along the length of the positive electrode sheet, where the positive leads are located, and cover the side edge on the opposite side at the positive electrode sheet at which burrs tend to occur readily. This structure is supposed to effectively prevent internal short-circuiting by eliminating the risk of burrs or the like breaking through two separator layers. (See Japanese Laid Open Patent Publication No. 2008-004476)

SUMMARY OF THE INVENTION

However, short-circuiting does occur even after housing the electrode group in a battery cell container and filling the battery cell container with electrolyte. While this phenomenon will be described in detail later, it is caused by foreign matter (metal powder) present in the electrolyte, as metal ions of the foreign matter originating from the positive electrode side pass through a separator and metal having become separated is deposited on the negative electrode. In other words, the metal deposit formed on the negative electrode causes short-circuiting between the positive electrode and the negative electrode.

Short-circuiting occurring as a result of this phenomenon cannot be prevented by the invention disclosed in the prior art reference mentioned above.

According to the 1st aspect of the present invention, a secondary battery cell comprises: an electrode group that includes a positive electrode and a negative electrode, an electrolyte, and a battery cell container that contains the electrode group and the electrolyte and that is sealed, wherein: an adhesive layer for trapping foreign matter present inside the battery cell container is disposed in the battery cell container by exposing at least part of the adhesive layer so as to allow the adhesive layer to come into contact with the electrolyte.

According to the 2nd aspect of the present invention, in a secondary battery cell according to the 1st aspect, it is preferred that at least part of the adhesive layer disposed inside the battery cell container is bonded to the electrode group.

According to the 3rd aspect of the present invention, in a secondary battery cell according to the 2nd aspect, it is preferred that the electrode group includes a separator disposed between the positive electrode and the negative electrode; and the adhesive layer disposed inside the battery cell container is bonded to the separator wound on an outermost circumferential side.

According to the 4th aspect of the present invention, in a secondary battery cell according to the 1st aspect, it is preferred that the electrode group includes a winding core around which the positive electrode and the negative electrode are wound; the battery cell container includes a bottom surface ranging perpendicular to an axis of the winding core; and the adhesive layer disposed inside the battery cell container is positioned between a side of the battery cell group, which faces opposite the bottom surface of the battery cell container, and the bottom surface of the battery cell container.

According to the 5th aspect of the present invention, in a secondary battery cell according to the 4th aspect, it is preferred that the adhesive layer includes an opening through which the winding core is inserted.

According to the 6th aspect of the present invention, in a secondary battery cell according to the 1st aspect, it is preferred that the battery cell container comprises a battery cell container in which the electrode group is housed and a lid unit disposed at an opening portion of the battery cell container; and the adhesive layer disposed inside the battery cell container is positioned between a side of the electrode group, which faces opposite the lid unit, and the lid unit.

According to the 7th aspect of the present invention, in a secondary battery cell according to the 1st aspect, further comprising an insulating sleeve for housing the electrode group, it is preferred that the adhesive layer disposed inside the battery cell container is housed inside the insulating sleeve.

According to the 8th aspect of the present invention, in a secondary battery cell according to the 1st aspect, it is preferred that the electrolyte is a non-aqueous electrolyte.

According to the 9th aspect of the present invention, in a secondary battery cell according to the 2nd aspect, it is preferred that the electrolyte is a non-aqueous electrolyte.

According to the 10th aspect of the present invention, in a secondary battery cell according to the 3rd aspect, it is preferred that the electrolyte is a non-aqueous electrolyte.

According to the 11th aspect of the present invention, in a secondary battery cell according to the 4th aspect, it is preferred that the electrolyte is a non-aqueous electrolyte.

According to the 12th aspect of the present invention, in a secondary battery cell according to the 5th aspect, it is preferred that the electrolyte is a non-aqueous electrolyte.

According to the 13th aspect of the present invention, in a secondary battery cell according to the 6th aspect, it is preferred that the electrolyte is a non-aqueous electrolyte.

According to the 14th aspect of the present invention, in a secondary battery cell according to the 7th aspect, it is preferred that the electrolyte is a non-aqueous electrolyte.

DESCRIPTION OF PREFERRED EMBODIMENTS (Embodiment 1)
—Secondary Battery Cell Structure—

The following is a description of a lithium ion cylindrical secondary battery cell achieved in an embodiment of the secondary battery cell according to the present invention, given in reference to drawings.

Figure 1:
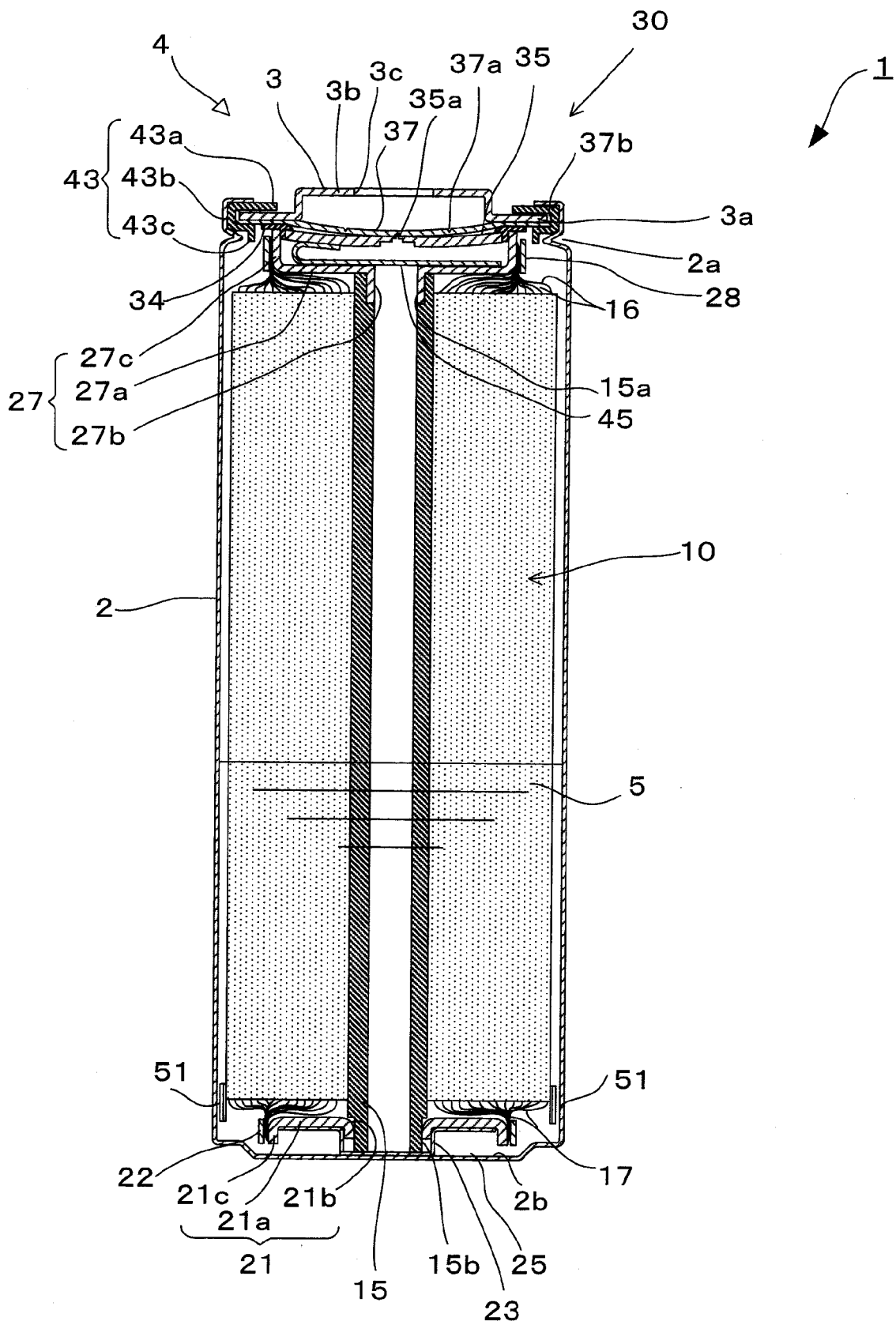
FIG. 1 is an enlarged sectional view of a cylindrical secondary battery cell achieved in an embodiment of the secondary battery cell according to the present invention.
Figure 2:
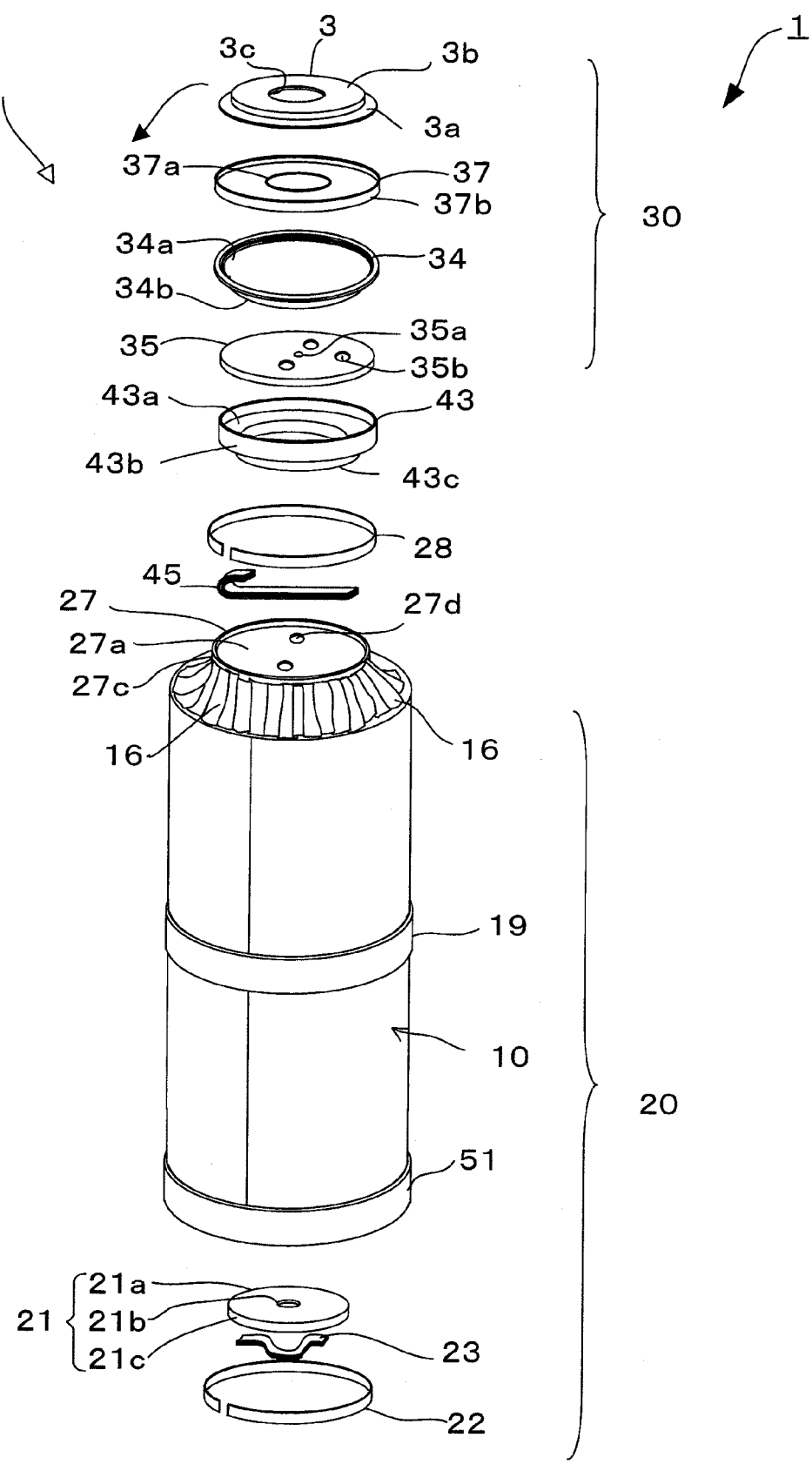
FIG. 2 is an exploded perspective view of the cylindrical secondary battery cell shown in FIG. 1.

FIG. 1 is an enlarged sectional view of the cylindrical secondary battery cell achieved in an embodiment of the present invention and FIG. 2 is an exploded perspective view of the cylindrical secondary battery cell in FIG. 1.

The cylindrical secondary battery cell 1 may assume an outer diameter of, for instance, 40 mm Ø and a height of, for instance, 100 mm. The cylindrical secondary battery cell 1 includes various structural members for power that will be described below are housed inside a battery cell container 4 constituted with a cylindrical battery cell casing 2 that is open at the top and has a bottom, and a hat shaped lid 3 that closes the upper portion of the battery cell casing 2. The battery cell container 4 is filled with a non-aqueous electrolyte 5.

Figure 3:
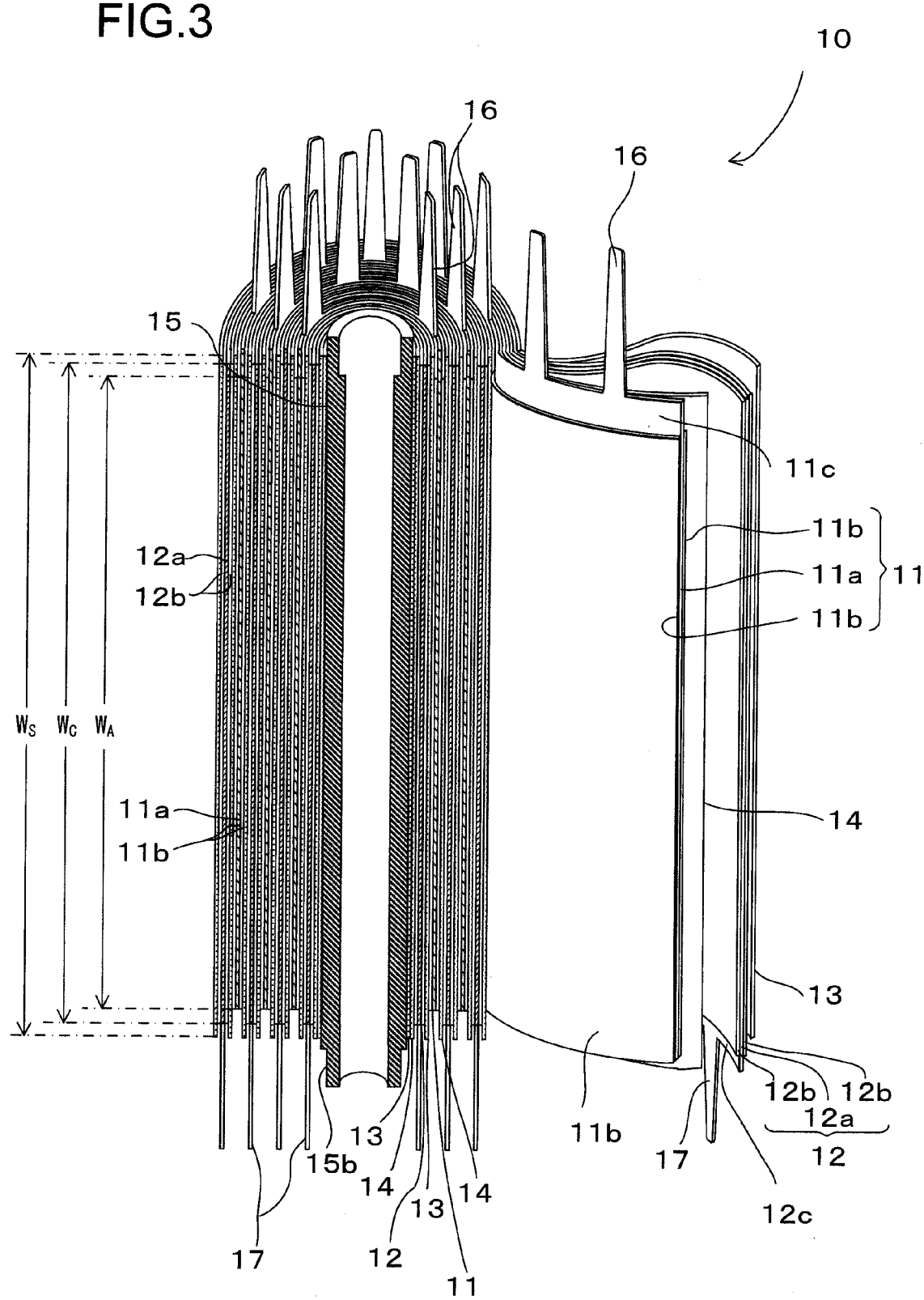
FIG. 3 is a perspective view showing the electrode group in FIG. 1 in detail in a partial cutaway view.

A groove 2a, recessed toward the inside of the cylindrical battery cell casing 2 with a bottom, is formed at its upper end portion, near the opening thereof. Reference numeral 10 indicates an electrode group that includes a winding core 15 at its central portion, around which a positive electrode and a negative electrode are wound. FIG. 3 shows the structure of the electrode group 10 in detail in a partial cutaway perspective view. As FIG. 3 illustrates, the electrode group 10 has a structure in which a positive electrode 11, a negative electrode 12 and first and second separators 13, 14 are wound around the winding core 15.

The winding core 15 has a shape of a hollow cylinder. Around the winding core 15, the negative electrode 12, the first separator 13, the positive electrode 11 and the second separator 14 layered in sequence, are wound. Further inward relative to the innermost turn of the negative electrode 12, the first separator 13 and the second separator 14 are wound over several turns (one turn in the example in FIG. 3). In addition, on the outermost circumferential side, the negative electrode 12 and the first separator 13 wound around the negative electrode 12 are present. The first separator 13 on the outermost circumferential side is held with an adhesive tape 19 (see FIG. 2).

The positive electrode 11, which is made of an aluminum foil and assumes an elongated shape, includes a positive electrode sheet 11a and a processed positive electrode portion where a positive electrode mixture is applied to form a positive electrode mixture layer 11b on both sides of the positive electrode sheet 11a. The upper side edge of the positive electrode sheet 11a, extending along the length of the positive electrode sheet 11a, is a positive electrode mixture untreated portion 11c where no positive electrode mixture is applied and the aluminum foil is exposed. At the positive electrode mixture untreated portion 11c, numerous positive leads 16, projecting upward along the axis of the winding core 15, are formed as integrated parts thereof at regular intervals.

The positive electrode mixture is constituted of an active positive electrode material, an electrically conductive positive electrode material and a positive electrode binder. The active positive electrode material is preferably a lithium metal oxide or a lithium transition metal oxide. For instance, lithium cobalt oxide, lithium manganate, lithium nickel oxide, or a compound lithium metal oxide (that includes two or more types of lithium metal oxides selected from; cobalt, nickel and manganese-based lithium metal oxides) may be used as the active positive electrode material. No particular restrictions are imposed with respect to the electrically conductive positive electrode material, as long as the substance can assist transmission of electrons generated in the positive electrode mixture through a lithium occlusion/emission reaction, to the positive electrode. Examples of materials that may be used as the electrically conductive positive electrode material include graphite and acetylene black. It is to be noted that the compound lithium metal oxide that includes transitional metal components mentioned above may also be used as the electrically conductive positive electrode material, since the substance is electrically conductive.

No particular restrictions are imposed with respect to the material that may constitute the positive electrode binder, as long as it holds together the active positive electrode material and the electrically conductive positive electrode material, the positive electrode mixture 11b layer and the positive electrode sheet 11a can be bound together via the positive electrode binder and it does not degrade through contact with the non-aqueous electrolyte 5. Examples of materials that may be used as the positive electrode binder include polyvinylidene fluoride (PVDF) and fluorine-containing rubber. No particular restrictions are imposed with respect to the method through which the positive electrode mixture layer 11b is formed, as long as the positive electrode mixture layer 11b is formed upon the positive electrode. For instance, the positive electrode mixture layer 11b may be formed by applying a solution, with substances constituting the positive electrode mixture dispersed therein, onto the positive electrode sheet 11a.

The positive electrode mixture may be applied onto the positive electrode sheet 11a through a roll-coating method, a slit-die coating method, or the like. A slurry containing a solvent for the solution with the positive electrode mixture dispersed therein, such as N-methylpyrrolidone (NMP), water or the like added therein and prepared by thoroughly incorporating the constituents through kneading, may be evenly applied onto both sides of an aluminum foil assuming a thickness of 20 μm and the positive electrode sheet may be subsequently cut out after allowing the slurry to dry. The positive electrode mixture may be applied onto each side of the positive electrode sheet over a thickness of approximately 40 μm. When the positive electrode sheet 11a is cut, the positive leads 16 are formed as integrated parts thereof. All the positive leads 16 should assume a substantially uniform length.

The negative electrode 12, which is constituted of copper foil and assumes an elongated shape, includes a negative electrode sheet 12a with a processed negative electrode portion, where a negative electrode mixture is applied to form a negative electrode mixture layer 12b on both sides of the negative electrode sheet 12a. A lower side edge of the negative electrode sheet 12a extending along the length of the negative electrode sheet is a negative electrode mixture untreated portion 12c where no negative electrode mixture is applied and the copper foil is exposed. Numerous negative leads 17 projecting along the axis of the winding core 15 in the direction opposite from the direction along which the positive leads 16 project, are formed as integrated parts of the negative electrode mixture untreated portion 12c at regular intervals.

The negative electrode mixture is constituted of an active negative electrode material, a negative electrode binder and a thickener. The negative electrode mixture may further include an electrically conductive negative electrode material such as acetylene black. It is desirable to use graphitic carbon and more specifically, artificial graphite, as the active negative electrode material. The use of graphitic carbon makes it possible to manufacture a lithium ion secondary battery cell optimal for a plug-in hybrid vehicle or electric vehicle, which requires a large capacity. No particular restrictions are imposed with respect to the method through which the negative electrode mixture layer 12b is formed as long as the negative electrode mixture layer 12b is formed upon the negative electrode sheet 12a. The negative electrode mixture may be applied onto the negative electrode sheet 12a by coating the negative electrode sheet 12a with a solution with substances constituting the negative electrode mixture dispersed therein. The solution may be applied through a roll-coating method, a split-die coating method or the like.

The negative electrode mixture may be applied onto the negative electrode sheet 12a by evenly coating both surfaces of a rolled copper foil assuming a thickness of 10 μm with a slurry of the negative electrode mixture with a dispersal solvent, such as N-methyl-2-pyrrolidone or water added thereto, kneaded for thorough mixing and by cutting the foil after allowing the slurry to dry. The negative electrode mixture may be applied to a thickness of, for instance, approximately 40 μm on each side. When the negative electrode sheet 12a is cut out by stamping, the negative leads 17 are formed as integrated parts thereof. All the negative leads 17 should assume a substantially uniform length.

$W_S$ representing the width of the first separator 13 and the second separator 14, $W_C$ representing the width of the negative electrode mixture layer 12b formed on the negative electrode sheet 12a and $W_A$ representing the width of the positive electrode mixture layer 11b formed on the positive electrode sheet 11a should satisfy a relationship expressed below.

$$W_S > W_C > W_A \text{ (see FIG. 3)}$$

Namely, the width Wc of the negative electrode mixture layer 12b must always be greater than the width $W_A$ of the positive electrode mixture layer 11b, since ionized active positive electrode material, i.e., lithium, permeating through the separators, will become deposited at the negative electrode sheet 12a to cause short-circuiting if the negative electrode sheet 12a includes an area where the active negative electrode material is not present and thus the negative electrode sheet 12a is exposed to the positive electrode mixture layer 11b in the lithium ion secondary battery cell. The first separator 13 and the second separator 14 are each constituted with a perforated polyethylene film assuming a thickness of 40 μm.

The hollow cylindrical winding core 15 in FIGS. 1 and 3 includes a stepped portion 15a with a diameter greater than the inner diameter of the winding core 15, located on the inner surface at its upper end along the axial direction (the vertical direction in the figures), with a positive electrode current collecting member 27 pressed in at the stepped portion 15a. The positive electrode current collecting member 27, which may be constituted of aluminum, includes a disk-shaped base portion 27a, a lower cylindrical portion 27b projecting out toward the winding core 15 at the surface of the base portion 27a facing the electrode group 10 and pressed in at the inner surface of the stepped portion 15a, and an upper cylindrical portion 27c projecting toward the lid 3 at the outer circumferential edge. Apertures 27d (see FIG. 2) through which gas generated inside the battery cell is released, are formed at the base portion 27a of the positive electrode current collecting member 27. It is to be noted that the winding core 15 is formed by using a material that electrically isolates the positive electrode current collector member 27 and a negative electrode current collector member 21 from each other and increases the rigidity of the battery cell along the axial direction. The winding core 15 in the embodiment may be formed with, for instance, a glass-fiber reinforced polypropylene.

The positive leads 16 at the positive electrode sheet 11a are all welded to the upper cylindrical portion 27c of the positive electrode current collecting member 27. The positive leads 16, set so as to overlap one another, are bonded to the upper cylindrical portion 27c of the positive electrode current collecting member 27, as illustrated in FIG. 2. The thickness of the individual positive leads 16 is extremely small and thus, a large electrical current cannot taken out via a single positive lead. Accordingly, numerous positive leads 16 are formed at predetermined intervals over the entire length of the positive electrode sheet 11a, from the start point at which the positive electrode sheet 11a starts winding around the winding core 15 through the winding endpoint.

The reliability of the positive electrode current collecting member 27, which is readily oxidized by the electrolyte, can be improved by forming it with aluminum. When the surface of aluminum is exposed through any type of processing, a coating of aluminum oxide is formed immediately on the surface. It is thus possible to prevent oxidation by the electrolyte with the aluminum oxide film.

Furthermore, the positive leads 16 at the positive electrode sheet 11a can be welded through ultrasonic welding, spot welding or the like, due to the fact that the positive electrode current collecting member 27 is constituted of aluminum.

At the outer circumference of the upper cylindrical member 27c of the positive electrode current collecting member 27, the positive leads 16 of the positive electrode sheet 11a and a ring-shaped holding member 28 are welded. The numerous positive leads 16, set in tight contact with the outer circumference of the upper cylindrical member 27c of the positive electrode current collecting member 27, are held temporarily in place with the holding member 28 placed on the outer side of the positive leads 16 so as to bundle them together, and the positive leads and the holding member are welded in this state.

A stepped portion 15b, the outer diameter of which is smaller than the outer diameter of the winding core 15, is formed at the outer circumferential surface of the winding core 15 at its lower end, with the negative electrode current collecting member 21 pressed in and fixed at the stepped portion 15b. The negative electrode current collecting member 21, which may be constituted of copper, includes a disk-shaped base portion 21a and an opening portion 21b formed at the disk-shaped base portion 21a and press-fitted at the stepped portion 15b of the winding core 15. It also includes an outer circumferential cylindrical portion 21c formed at the outer circumferential edge and projecting out toward the outside at the bottom of the battery cell casing 2.

The negative leads 17 at the negative electrode sheet 12a are all welded to the outer circumferential cylindrical portion 21c of the negative electrode current collecting member 21 through ultrasonic welding or the like. The thickness of the individual negative leads 17 is extremely small and, therefore, a single negative lead cannot handle a large electrical current. Accordingly, numerous negative leads 17 are formed at predetermined intervals over the entire length of the negative electrode sheet 12a, from the start of its winding onto the winding core 15 to the end of its winding.

At the outer circumference of the outer circumferential cylindrical portion 21c of the negative electrode current collecting member 21, the negative leads 17 of the negative electrode sheet 12a and a ring-shaped holding member 22 are welded. The numerous negative leads 17, set in tight contact with the outer circumference of the outer circumferential cylindrical portion 21c of the negative electrode current collecting member 21, are held temporarily in place with the holding member 22 placed on the outer side of the negative leads 17 so as to bundle them together, and the negative leads and the holding member are welded in this state.

A negative electrode power lead 23, constituted of copper, is welded to the lower surface of the negative electrode current collecting member 21. The negative electrode power lead 23 is welded to the battery cell casing 2 at the bottom of the battery cell casing 2. The battery cell casing 2 may be constituted of nickel-plated carbon steel with a 0.5 mm thickness. The use of such a material makes it possible to weld the negative electrode power lead 23 to an inner surface 2b at the bottom of the battery cell casing 2 through resistance welding or the like. The battery cell casing 2 connected to the negative electrode current collecting member 21 functions as another output terminal. Thus it becomes possible to output the stored electric power from the lid 3 that functions as one output terminal and the battery cell casing 2 that functions as the another output terminal.

Figure 4:
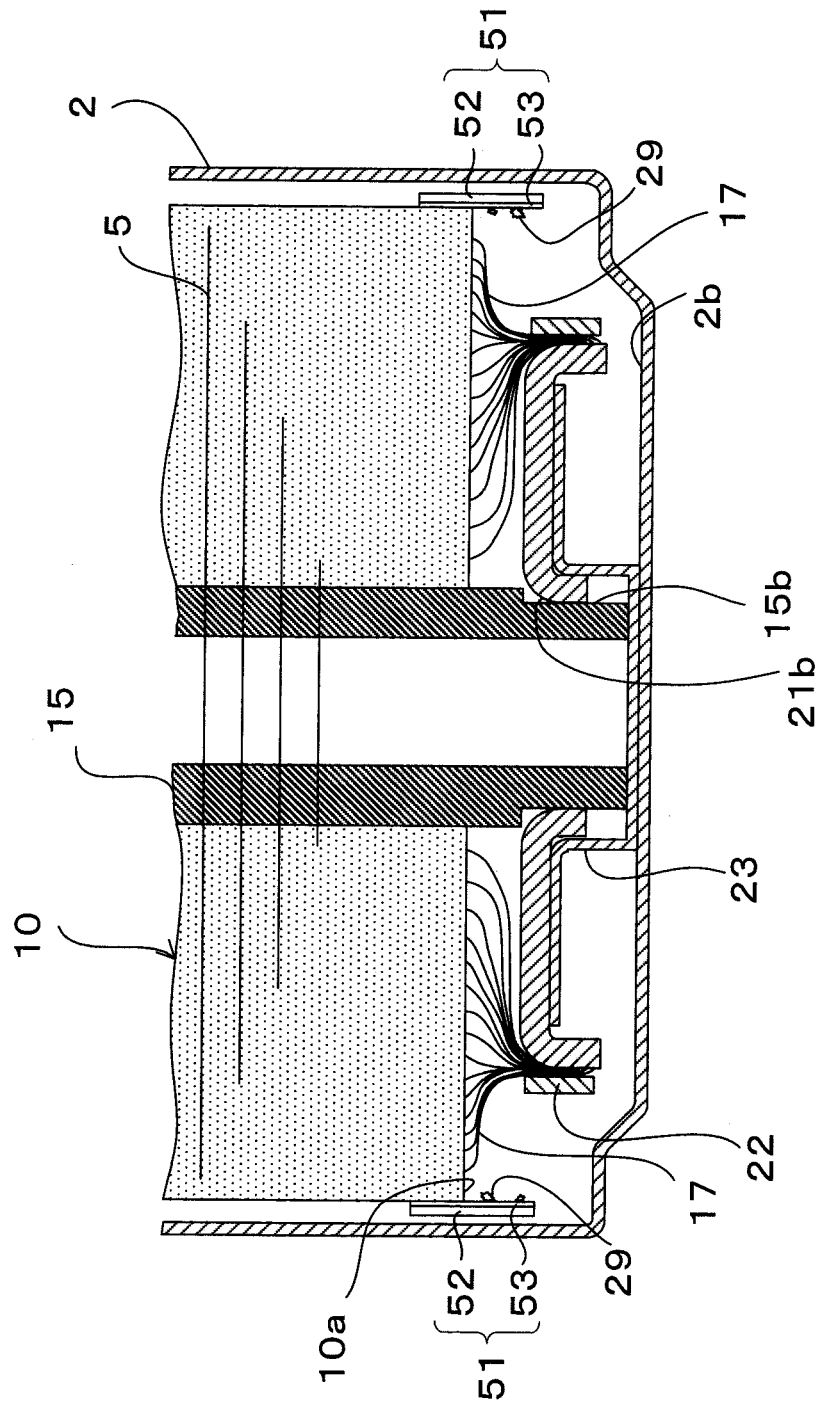
FIG. 4 is an enlarged sectional view of the essential structure of the secondary battery cell achieved in embodiment 1 of the present invention.

FIG. 4 is an enlarged sectional view showing in detail the bottom side of the cylindrical secondary battery cell 1.

An adhesive tape 51 is fixed onto the outermost circumference of the battery cell group 10, i.e., at the outermost circumferential side surface of the first separator 13. The adhesive tape 51 includes a base film 52 and an adhesive layer 53 formed on the base film 52. The adhesive layer 53 of the adhesive tape 51 is positioned toward the electrode group 10 and is fixed to the electrode group 10 with one of the two side portions of the adhesive tape along the width of the adhesive tape projecting out beyond a lower side portion 10a of the electrode group 10. The adhesive tape 51 is wound along the outer circumferential surface of the electrode group 10 so as to encircle the electrode group substantially once, as shown in FIG. 2. The adhesive tape 51 will be described in detail later.

At the outer circumference of the upper cylindrical portion 27c of the positive electrode current collecting member 27, the positive leads 16 of the positive electrode sheet 11a and the ring-shaped holding member 28 are welded. The numerous positive leads 16, set in tight contact with the outer circumference of the upper cylindrical member 27c of the positive electrode current collecting member 27 are held temporarily in place with the holding member 28 placed on the outer side of the positive leads 16 so as to bundle them together, and the positive leads and the holding member are welded in this state.

As the numerous positive leads 16 are welded to the positive electrode current collecting member 27 and the numerous negative leads 17 are welded to the negative electrode current collecting member 21, a power generating unit 20 that includes the positive electrode current collecting member 27, the negative electrode current collecting member 21 and the electrode group 10 as integrated parts thereof, is manufactured (see FIG. 2). However, for clarity of illustration, FIG. 2 shows the negative electrode current collecting member 21, the holding member 22 and the negative electrode power lead 23 separated from the power generating unit 20.

In addition, a flexible connecting member 45, formed by layering a plurality of aluminum foils, is bonded onto the upper surface of the base portion 27a of the positive electrode current collecting member 27 by welding one end of the connector member to the upper surface. The connecting member 45 is formed by laminating and integrating a plurality of aluminum foils, thus the connecting member 45 is endowed with characteristics of allowing large current flow and of flexibility. Namely, while the connecting member needs to assume a significant thickness to handle a large current, the rigidity of a connecting member constituted with a single metal plate is bound to be significant, and thus, a high degree of flexibility cannot be assured. Accordingly, the connecting member is formed by laminating numerous aluminum foils each assuming a small thickness so as to achieve flexibility. A connecting member 45 with a thickness of, for instance, approximately 0.5 mm may be formed by laminating five aluminum foils with a thickness of 0.1 mm.

A lid unit 30 is disposed atop the upper cylindrical portion 27c of the positive electrode current collecting member 27. The lid unit 30 includes a ring-shaped insulating plate 34, a connecting plate 35 fitted in an opening portion 34a of the insulating plate 34, a diaphragm 37 welded to the connecting plate 35 and the lid 3 fixed to the diaphragm 37 by swaging.

The insulating plate 34, assuming a ring shape with a round opening portion 34a and constituted of an insulating resin material, is disposed atop the upper cylindrical portion 27c of the positive electrode current collecting member 27.

The insulating plate 34 includes the opening portion 34a (see FIG. 2) and a side portion 34b projecting downward. The connecting plate 35 is fitted in the opening portion 34a of the insulating member 34. At the lower surface of the connecting plate 35, another end of the connector member 45 is bonded through welding. The connector member 45 is made to curve to an extent substantially matching the range of a semicircle on the side where the other end is located so that it is welded to the connecting plate 35 on the same surface as the surface at which it is welded to the positive electrode current collecting member 27.

The connecting plate 35 is constituted of an aluminum alloy and has a substantial dish shape slightly sagged towards its center and with uniform thickness over the entire area except the center portion. The thickness of the connecting plate 35 may be set to, for instance, approximately 1 mm. A thin dome-shaped projection 35a is formed at the center of the connecting plate 35, and a plurality of apertures 35b (see FIG. 2) are formed around the projection 35a. Through the apertures 35b, gas generated inside the battery cell can be released.

The projection 35a at the connecting plate 35 is bonded to the bottom surface of the diaphragm 37 at the center thereof through resistance welding or friction stir welding. The diaphragm 37, constituted of an aluminum alloy, includes a circular groove 37a concentric with diaphragm 37. The groove 37a is formed by pressing V-shaped depression into the upper surface side of the diaphragm with a press, thereby thinning the grooved portion. The diaphragm 37, installed so as to assure battery cell safety, bulges upward when the battery cell internal pressure increase, is disengaged from the connecting plate 35 as in a first stage by braking away the connection between the projection 35a and the connecting plate 35, and the electrical continuity with the connecting plate 35 is cut off. Then, as in a second stage when the internal pressure further continues to rise, the diaphragm ruptures at the groove 37a, to release the gas built up inside the battery cell container.

The diaphragm 37 fixes a circumferential edge portion of the lid 3 at its edge area. As shown in FIG. 2, the diaphragm 37 includes a side portion 37b located at the circumferential edge thereof, which initially ranges upright toward the lid 3. The lid 3 is set inside the side portion 37b and then the lid 3 is fixed by bending the side portion 37b toward the upper surface of the lid 3 through swaging.

The lid 3, constituted of a ferrous metal such as a carbon steel, and treated through nickel plating, assumes a cap shape that includes a disk-shaped circumferential edge portion 3a that comes into contact with the diaphragm 37 and a top portion 3b projecting upward from the circumferential edge portion 3a. An opening 3c is formed at the top portion 3b. If the pressure of the gas built up inside the battery cell causes a fracture of the diaphragm 37, the gas inside the battery cell is released through the opening 3c. Through the lid 3 functioning as one of the power output terminals, electric power stored in the battery cell can be output.

It is to be noted that, assuming that the lid 3 is constituted of a ferrous metal, the cylindrical secondary battery cell can be connected in series with another cylindrical secondary battery cell through spot welding, when this another cylindrical secondary battery cell is formed with ferrous metal.

A gasket 43 is disposed so as to cover the side portion 37b and the circumferential edge of the diaphragm 37. The gasket 43 assumes a shape that includes a ring-shaped base portion 43a, an outer circumferential wall portion 43b located at the circumferential side edge of the base portion 43a, which initially ranges upward substantially at a right angle from the base portion 43a, as shown in FIG. 2, and a cylindrical portion 43c located on the inner circumferential side, which is formed to range downward substantially at a right angle from the base portion 43a.

While a detailed description will be provided later, the outer circumferential wall portion 43b of the gasket 43 is bent together with the battery cell casing 2 with a press or the like and the diaphragm 37 and the lid 3 are swaged by pressing them in contact along the axial direction with the base portion 43a and the outer circumferential wall portion 43b. As a result, the lid 3 and the diaphragm 37 become fixed to the battery cell casing 2 via the gasket 43.

The interior of the battery cell casing 2 is filled with a predetermined quantity of the non-aqueous electrolyte 5. It is desirable that the non-aqueous electrolyte 5 be constituted with, for instance, a solution prepared by dissolving lithium salt in a carbonate-series solvent. Examples of lithium salts that may be used include lithium hexafluoro-phosphate (LiPF6) and lithium tetrafluoro-borate (LiBF6). In addition, examples of carbonate-series solvents that may be used include ethylene carbonate (EC), dimethyl carbonate (DMC), propylene carbonate (PC), methyl-ethyl carbonate (MEC) and mixtures of two or more solvents selected from the above.

As explained earlier, the numerous positive leads 16 formed at the positive electrode 11 are all welded to the outer circumference of the upper cylindrical portion 27c of the positive electrode current collecting member 27 through ultrasonic welding or the like. For the welding process, the positive leads 16, distributed substantially uniformly over the outer circumferential of the upper cylindrical portion 27c of the positive electrode current collecting member 27, are set in tight contact with the outer circumference of the upper cylindrical portion 27c, and the holding member 28 is set so as to encircle the outer side of the positive leads 16. Then, the positive leads 16 and the holding member 28 are welded to the positive electrode current collecting member 27 through ultrasonic welding or the like.

During this process, the individual positive leads 16 being welded to the positive electrode current collecting member 27 are bound to be pulled toward the positive electrode current collecting member 27. As a result, areas of the positive electrode mixture untreated portion of the positive electrode sheet 11a, which correspond to the base areas of the individual positive leads 16, are pulled toward the positive electrode current collecting member 27 together with the positive leads 16. This, in turn, creates a misalignment between the area of the positive electrode mixture untreated portion 11c corresponding to the individual positive leads 16 and the second separator 14 adjacent to the positive electrode sheet on the outer side.

In turn, a great number of minute conductive foreign matter particles (metal particles) are present in the non-aqueous electrolyte 5 filling the interior of the battery cell casing 2. Such foreign matter is formed while the positive electrode sheet 11 and the negative electrode sheet 12 are being manufactured, while the battery cell casing 2 is processed, while the positive leads 16 are welded to the positive electrode current collecting member 27 and the like, and become mixed in the non-aqueous electrolyte 5. The foreign matter generated through the various processes listed above and mixed in the non-aqueous electrolyte 5 tends to readily enter the space between the positive electrode 11 and the second separator 14 through the gaps formed between the positive leads 16 and the second separator 14 adjacent to the positive electrode sheet on the outer side, as described above. In addition, the foreign matter generated through the various processes and mixed in the non-aqueous electrolyte 5 may enter through the gaps formed between the positive electrode 11 and the first separator 13 or through other gaps between the positive electrode 11 and the second separator 14.

Since there is a defined electrical voltage, e.g., 4.1 V, between the positive electrode 11 and the negative electrode 12, the foreign matter, i.e., metal particles, having entered the space between the positive electrode 11 and the first separator 13 or the space between the positive electrode 11 and the second separator 14 is bound to become dissolved and ionized, which will then permeate through the separator to flow toward the negative electrode 12. The metal will then be deposited and grow, accumulated at the negative electrode 12. This metal deposit will eventually induce short-circuiting between the positive electrode and the negative electrode.

Accordingly, the present invention includes the adhesive tape 51 used to capture foreign matter 29 having entered the battery cell container by trapping it into the adhesive layer 53 thereof, as illustrated in FIG. 4. With the adhesive tape, foreign matters which may enter into the battery cell container from the air during a manufacturing process and those which may enter the battery container via the liquid medium following the electrolyte filling process, which foreign matters become the stray foreign particles, can be captured. The adhesive tape 51 is constituted with the base film 52 and the adhesive layer 53 formed on the base film 52. The base film 52 is a film constituted of a material with a high solvent resistance, such as polypropylene. In addition, the adhesive layer 53 is constituted of a material that is tacky at room temperature, such as an acrylic adhesive compound. The adhesive layer 53 assumes a film thickness of 30 to 60 μm. The adhesive layer 53 sustains its tackiness even within the non-aqueous electrolyte 5.

The adhesive tape 51 is applied onto the outer most circumference of the electrode group 10 i.e., onto the outermost circumferential surface of the first separator 13, before placing the electrode group 10 into the battery cell casing 2. The adhesive tape 51 is applied onto the electrode group 10 by turning the adhesive layer 53 toward the electrode group 10 and positioning the adhesive tape 51 so as to allow part of the adhesive tape 51 along the width thereof, e.g., substantially half the adhesive tape 51 along the width thereof, to project out beyond the side portion 10a of the electrode group 10 in its axial direction. It is desirable to wrap the electrode group 10 along the outer circumferential surface thereof substantially over a full turn with the adhesive tape 51 and apply the adhesive tape 51 onto the electrode group 10 in this state so that the adhesive is partially overlapped in the circumferential direction, as illustrated in FIG. 2, by which the adhesive tape becomes resistant against peeling off.

After the electrode group 10 with the adhesive tape 51 adhered thereupon is housed inside the battery cell casing 2, the interior of the battery cell casing 2 is filled with the non-aqueous electrolyte 5. At this time, the entire inner space of the battery cell casing 2 is not necessarily filled with the non-aqueous electrolyte 5. As the non-aqueous electrolyte 5 is poured in, the portion of the adhesive layer 53 of the adhesive tape 51 projecting out beyond the side portion 10a of the electrode group 10 in its axial direction comes into contact with the non-aqueous electrolyte 5.

As described earlier, the non-aqueous electrolyte 5 may contain foreign matter having been created while manufacturing the positive electrode sheet 11 and the negative electrode sheet 12 and having settled on the power generating unit, foreign matter having been created while processing the battery cell casing 2 and having settled on the interior of the battery cell casing 2, foreign matter settled on internal components, foreign matter having been in a straying state during a manufacturing process and having settled on internal components, foreign matter subsequently created while sealing the battery cell container and the like.

Subsequently, the battery cell casing 2 is sealed with the lid unit 30 fixed onto the upper opening of the battery cell container through swaging or the like, and then the secondary battery cell 1 will be moved or transported. During this process, the secondary battery cell is bound to be subjected to vibrations and jolts. As a result, the non-aqueous electrolyte 5 in the secondary battery cell 1 will vibrate or be jolted, which, in turn, will cause the foreign matter 29 present in the non-aqueous electrolyte 5 to come into contact with and be trapped at the adhesive layer 53.

Next, an example of a manufacturing method through which the secondary battery cell structured as described above may be manufactured.

—Secondary Battery Cell Manufacturing Method—

(Manufacturing the Electrode Group)

The electrode group 10 is first manufactured.

The positive electrode 11 is manufactured by forming the positive electrode mixture layer 11b and the positive electrode mixture untreated portion 11c on both sides of the positive electrode sheet 11a and by forming the numerous positive leads 16 as integrated parts of the positive electrode sheet 11a. In addition, the negative electrode 12 is manufactured by forming the negative electrode mixture layer 12b and the negative electrode mixture untreated portion 12c on both sides of the negative electrode sheet 12a and by forming the numerous negative leads 17 as integrated parts of the negative electrode sheet 12a.

Then, the positive electrode group 10 is manufactured by winding the first separator 13, the positive electrode 11, the second separator 14 and the negative electrode 12 around the winding core 15 in this order, as illustrated in FIG. 3. The innermost edge portions of the first separator 13 and the second separator 14 may be welded to the winding core so as to allow them to be wound with ease against the resistance of the imposed load during the winding process. The outermost separator in the electrode group 10 is bonded with the tape 19 (see FIG. 2).

(Manufacturing the Power Generating Unit)

Next, the power generating unit is manufactured by using the electrode group 10 with the adhesive tape 51 applied thereupon.

The negative electrode current collecting member 21 is fitted onto the lower portion of the winding core 15 at the electrode group 10. The negative electrode current collecting member 21 is attached by fitting the opening portion 21b of the negative electrode current collecting member 21 over the stepped portion 15b formed at the lower end of the winding core 15. Then, the negative leads 17, distributed substantially uniformly over the entire outer circumference of the outer circumferential cylindrical portion 21c of the negative electrode current collecting member 21, are set in tight contact with the outer circumference of the outer circumferential cylindrical portion 21c and the holding member 22 is wound around over the outer side of the negative leads 17. The negative leads 17 and the holding member 22 are welded to the negative electrode current collecting member 21 through ultrasonic welding or the like in this state. Next, the negative electrode power lead 23 ranging astride the lower end surface of the winding core 15 and the negative electrode current collecting member 21 is welded to the negative electrode current collecting member 21.

Next, the lower cylindrical member 27b of the positive electrode current collecting member 27 at the winding core 15 is fitted into the stepped portion 15a located at the upper end of the winding core 15. The positive leads 16 of the positive electrode 11 are then set in tight contact with the outer surface of the upper cylindrical portion 27c at the positive electrode current collecting member 27. The holding member 28 is wound around the outer circumferential side of the positive leads 16, and the positive leads 16 and the holding member 28 are welded to the upper cylindrical portion 27c of the positive electrode current collecting member 27 through ultrasonic welding or the like in this state. The power generating unit 20 is thus manufactured.

(Attaching the Adhesive Tape)

Following the manufacturing steps described above, the adhesive tape 51 is attached to the electrode group 10.

As explained earlier, the adhesive tape 51 is applied onto the electrode group 10 by turning the adhesive layer 53 toward the electrode group 10 and positioning the adhesive tape 51 so as to allow part of the adhesive tape 51 along the width thereof, e.g., substantially half the adhesive tape 51 along the width thereof, to project out beyond the side portion 10a of the electrode group 10 in the axial direction. It is desirable to wrap the electrode group 10 along the outer circumferential surface thereof with the adhesive tape 51 substantially over a full turn and apply the adhesive tape 51 onto the electrode group 10 in this state, as illustrated in FIG. 2.

(Placing the Power Generating Unit into the Battery Cell Container)

Next, the power generating unit 20 is placed inside the battery cell casing 2.

The power generating unit 20 having been manufactured through the manufacturing steps described above is housed inside a metal cylindrical member with a bottom, assuming a size large enough to house the power generating unit 20. The cylindrical member with a bottom is a member that is to eventually become the battery cell casing 2. In order to provide a clear, simple description below, the cylindrical member with a bottom will be referred to as the battery cell casing 2 in the following explanation.

(Welding of the Negative Electrode)

In the next process, the negative electrode side of the power generating unit 20 is welded to the battery cell casing 2.

The negative electrode power lead 23 in the power generating unit 20 having been placed inside the battery cell casing 2 is welded to the bottom inner surface 2b of the battery cell casing 2 through resistance welding or the like. While the welding process is not shown in the figures, the negative electrode power lead 23 is welded to the bottom inner surface 2b of the battery cell casing 2 by pressing the negative electrode power lead 23 against the bottom inner surface 2b with an electrode rod inserted from the outside of the battery cell casing 2 through the hollow center of the winding core 15.

Next, a portion of the battery cell casing 2 at its upper end is pushed inward through a drawing process, so as to form the groove 2a assuming a substantially V-shape at the outer surface. The groove 2a is formed at the battery cell casing 2 so as to assume a position at the upper end area of the power generating unit 20, i.e., at a position near the upper end of the positive electrode current collecting member 27. It is to be noted that the shape and the size of the groove 2a formed through this process are not the final shape and size, as explained later. In other words, the groove 2a assumes a temporary shape and size at this point.

(Electrolyte Filling)

Next, the interior of the battery cell casing 2 is filled with a predetermined quantity of the non-aqueous electrolyte 5.

It is desirable that the non-aqueous electrolyte 5 be constituted with, for instance, a solution prepared by dissolving lithium salt in a carbonate-series solvent. Examples of lithium salts that may be used include lithium hexafluoro-phosphate (LiPF6) and lithium tetrafluoro-borate (LiBF6). In addition, examples of carbonate-series solvents that may be used include ethylene carbonate (EC), dimethyl carbonate (DMC), propylene carbonate (PC) methyl-ethyl carbonate (MEC) and mixtures of two or more solvents selected from the above.

(Manufacturing the Lid Unit)

The lid unit 30 is manufactured through processes independent of the processes described above.

As explained earlier, the lid unit 30 is constituted with the insulating plate 34, the connecting plate 35 fitted in the opening 34a of the insulating plate 34, the diaphragm 37 welded to the connecting plate 35 and the lid 3 fixed to the diaphragm 37 through swaging.

The lid unit 30 is manufactured by first locking the lid 3 to the diaphragm 37. The diaphragm 37 and the lid 3 are locked together through swaging or the like. As illustrated in FIG. 2, the side wall 37b of the diaphragm 37 is formed so as to initially range at a right angle relative to the base portion 37a, and the circumferential edge 3a of the lid 3 is positioned inside the side wall 37b of the diaphragm 37. Then, the shape of the side wall 37b at the diaphragm 37 is deformed through pressing or the like and the side wall 37b is pressed so as to cover the upper surface and the lower surface at the circumferential edge of the lid 3 and also cover the outer circumferential side surface of the lid 3.

In addition, the connecting plate 35 is attached by fitting it in the opening 34a of the insulating plate 34. Then, the projection 35a at the connecting plate 35 is welded to the bottom surface of the diaphragm 37 to which the lid 3 has been locked. The projection 35a may be welded through resistance welding or friction stir welding. As the connecting plate 35 and the diaphragm 37 are welded together, the lid unit 30 is manufactured as an integrated unit that includes the insulating plate 34 fitted with the connecting plate 35 and the lid 3 fixed to the diaphragm 37.

(Welding of the Positive Electrode)

Next, the positive electrode side of the power generating unit 20 and the lid unit 30 are electrically connected.

One end of the connector member 45 is welded to the base portion 27a of the positive electrode current collecting member 27 through, for instance, ultrasonic welding. Next, the lid unit 30, having been manufactured as an integrated unit of the lid 3, the diaphragm 37, the connecting plate 35 and the insulating plate 34, is closely positioned around the other end of the connector member 45. In the next step, the other end of the connector member 45 is welded to the lower surface of the connecting plate 35 through laser welding. The laser welding process is executed by ensuring that the bonding surface of the connector member 45, at which its other end is bonded with the connecting plate 35, is the same as the bonding surface of the connector member 45 at which its one end is welded to the positive electrode current collecting member 27, with a bended shape of the connecting member 45 close to its other end, as shown in FIG. 2.

(Sealing the Battery Cell Container)

Then, the battery cell casing 2 is sealed by fixing the lid unit 30, which is electrically connected to the positive electrode current collecting member 27 of the power generating unit 20 housed inside the battery cell casing 2, to the battery cell casing 2.

The gasket 43 is set over the groove 2a at the battery cell casing 2. The gasket 43 in this state includes the outer circumferential wall portion 43b ranging upward from the ring-shaped base portion 43a at a right angle relative to the base portion 43a, as shown in FIG. 2. The gasket 43 assuming this structure is held inside over the groove 2a at the battery cell casing 2. The gasket 43 is constituted of rubber, and while there are no limitations otherwise imposed, examples of desirable materials that may be used to form the gasket 43 include an ethylene propylene copolymer (EPDM). For instance, the battery cell casing 2 may be formed by using carbon steel so as to assume an outer diameter of 40 mm and a thickness of 0.5 mm and the gasket 43 may be formed by using an EPDM having a 1 mm thickness.

Next, the lid unit 30, electrically connected with the positive electrode current collecting member 27 in the power generating unit 20, is positioned atop the cylindrical portion 43c of the gasket 43. More specifically, the lid unit 30 is positioned by aligning the circumferential edge of the diaphragm 37 along the cylindrical portion 43c of the gasket 43. At this time, the upper cylindrical portion 27c of the positive electrode current collecting member 27 should be fitted at the outer circumference of the side portion 34b of the insulating plate 34.

In this state, the diaphragm 37, together with the gasket 43, is fixed to the battery cell casing 2 by compressing the area between the groove 2a of the battery cell casing 2 and the upper end surface with a press, i.e., through swaging.

Consequently, the lid unit 30, manufactured as an integrated unit of the diaphragm 37, the lid 3, the connecting plate 35 and the insulating plate 34, is fixed via the gasket 43 to the battery cell casing 2 and the positive electrode current collecting member 27 and the lid 3 are electrically connected via the connector member 45, the connecting plate 35 and the diaphragm 37, thereby completing the manufacturing processes for the cylindrical secondary battery cell 1 shown in FIG. 1.

The cylindrical secondary battery cell 1, having been manufactured as described above, will then be moved or transported. During this process, the secondary battery cell is bound to be subjected to vibrations and jolts. As a result, the non-aqueous electrolyte 5 in the secondary battery cell 1 will also vibrate or be jolted, which, in turn, will cause the foreign matter 29 present in the non-aqueous electrolyte 5 to come into contact with and be trapped at the adhesive layer 53.

It is to be noted that the adhesive layer 53 may be housed inside the battery cell container 4 by adopting structures other than that described above. The following is a description of various structures that may be adopted to allow the adhesive layer 53 to be housed inside the battery cell container 4.

(Embodiment 2)

Figure 5:
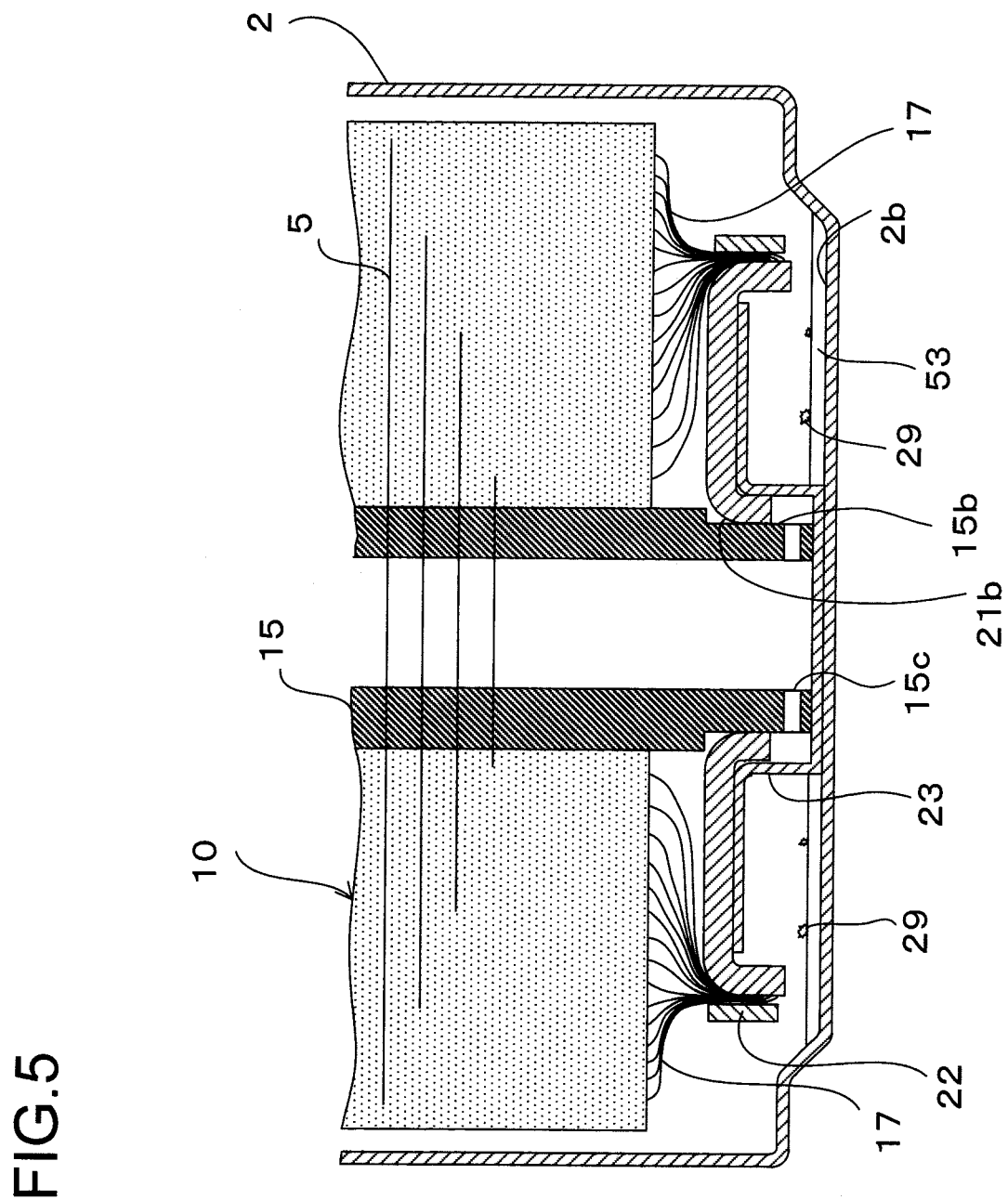
FIG. 5 is an enlarged sectional view of the essential structure of the secondary battery cell achieved in embodiment 2 of the present invention.

FIG. 5 is a sectional view showing the structure adopted in the adhesive layer 53 to be housed inside the battery cell container 4 in embodiment 2 of the secondary battery cell according to the present invention.

The adhesive layer 53 in the embodiment 2 is a coating applied onto the bottom inner surface 2b of the battery cell casing 2.

In this embodiment, the adhesive layer 53 is directly deposited on the bottom inner surface 2b of the battery cell casing 2 without using a base film. While the adhesive layer 53 may be formed on the bottom inner surface 2b of the battery cell casing 2 by spreading a liquid adhesive at the bottom of the battery cell casing 2 in advance, it may be formed after placing the battery cell unit 20 inside the battery cell casing 2 instead. In the latter case, the power generating unit 20, with an opening 15c formed in advance at the front end of the winding core 15, should be placed inside the battery cell casing 2. Then, a liquid adhesive should be dispensed from above the winding core 15 through the hollow space within the winding core 15 and the liquid adhesive thus dispensed should be allowed to spread over the bottom inner surface 2b of the battery cell casing 2. The adhesive thus spread over the bottom inner surface forms the adhesive layer 53.

As the non-aqueous electrolyte 5 comes in contact with the adhesive layer 53 formed inside the battery cell container 4 as described above, the foreign matter 29 mixed in the non-aqueous electrolyte 5 is caught and trapped at the adhesive layer 53.

(Embodiment 3)

Figure 6:
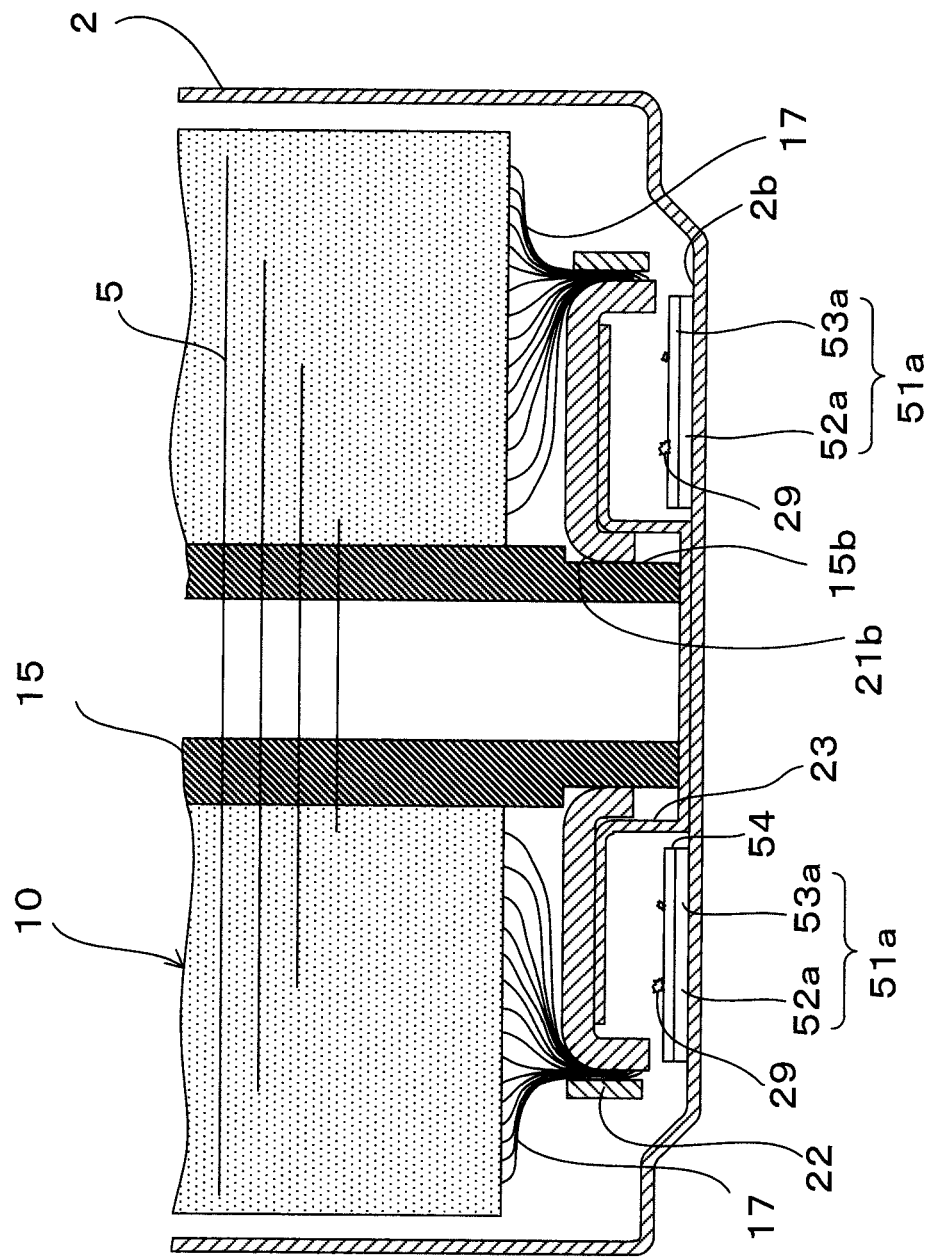
FIG. 6 is an enlarged sectional view of the essential structure of the secondary battery cell achieved in embodiment 3 of the present invention.

FIG. 6 is a sectional view showing the structure adopted in an adhesive layer 53a to be housed inside the battery cell container 4 the embodiment 3 of the secondary battery cell according to the present invention. It should be noted that the adhesive layer 53a is of a same material as the adhesive layer 53.

In embodiment 3, an adhesive sticker 51a is disposed upon the bottom inner surface 2b of the battery cell casing 2. The adhesive sticker 51a includes the adhesive layer 53a formed on a base film 52a that is of a same material as the base film 52, and is housed inside the battery cell casing 2 with the base film 52a placed on the bottom inner surface 2b of the battery cell casing 2 and the adhesive layer 53a facing to the electrode group 10. It should be noted that the base film 52a is of a same material as the base film 52.

The adhesive sticker 51a includes a round opening 54 formed at a central area, and the negative electrode power lead 23 is inserted through the opening 54. Thus, even if the adhesive sticker 51a becomes lifted into the non-aqueous electrolyte 5, it does not become displaced by an extent equal to or greater than the range of the clearance between the opening 54 and the negative electrode power lead 23. This means that the adhesive sticker 51a does not need to be bonded. However, the adhesive sticker 51a in embodiment 3 may be bonded to the bottom inner surface 2b of the battery cell casing 2, as well.

The adhesive sticker 51a may be disposed on the bottom inner surface 2b of the battery cell casing 2 before placing the power generating unit 20 inside the battery cell casing 2 or it may be temporarily held onto the power generating unit 20 and may be placed into the battery cell casing 2 together with the power generating unit 20 in this state.

As the non-aqueous electrolyte 5 comes in contact with the adhesive layer 53a of the adhesive sticker 51a disposed inside the battery cell container 4 as described above, the foreign matter 29 mixed in the non-aqueous electrolyte 5 is caught and trapped at the adhesive layer 53a.

It is to be noted that sparks may occur while welding the negative electrode power lead 23 to the bottom inner surface 2b of the battery cell casing 2 with the electrode rod and a spark landing on the bottom inner surface 2b of the battery cell casing 2 may cause short-circuiting. As a preventive measure against short-circuiting, an insulating film (not shown) may be disposed or bonded onto the bottom inner surface 2b of the battery cell casing 2. If such an insulating film is present on the bottom inner surface 2b, the adhesive sticker 51a should be formed over the insulating film.

(Embodiment 4)

Figure 7:
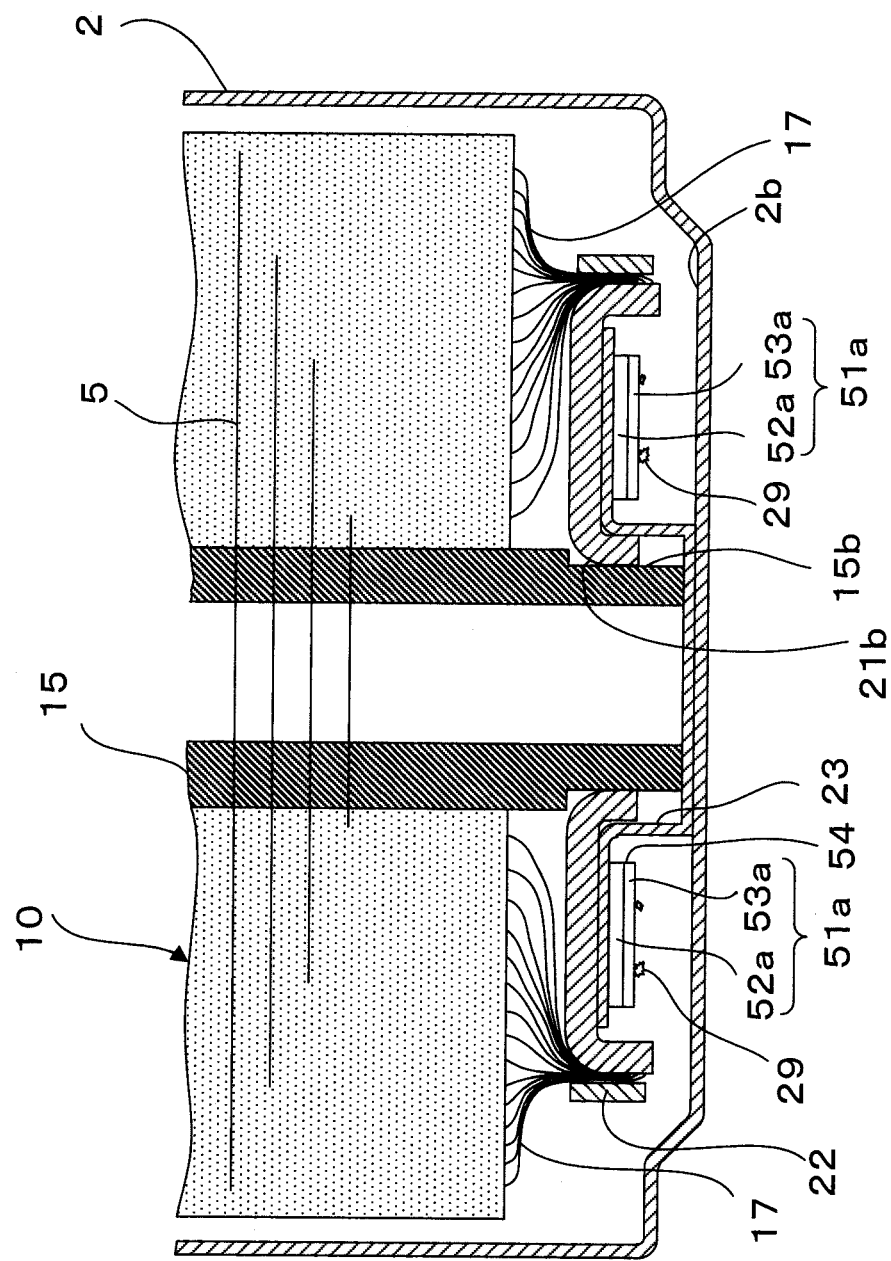
FIG. 7 is an enlarged sectional view of the essential structure of the secondary battery cell achieved in embodiment 4 of the present invention.

FIG. 7 is a sectional view showing the structure adopted in the adhesive layer 53a to be housed inside the battery cell container 4 in embodiment 4 of the secondary battery cell according to the present invention.

The adhesive sticker 51a in the embodiment 4 is disposed at the lower surface along the circumferential edge of the negative electrode power lead 23.

The adhesive sticker 51a includes the adhesive layer 53a formed on a base film 52, and is housed inside the battery cell casing 2 with the base film 52a turned toward the negative electrode power lead 23 and the adhesive layer 53a turned toward the bottom inner surface 2b of the battery cell casing 2.

The adhesive sticker 51a includes a round opening 54 formed at a central area, and the negative electrode power lead 23 is inserted through the opening 54. Thus, even if the adhesive sticker 51a sinks into the non-aqueous electrolyte 5, it does not become displaced by an extent equal to or greater than the range of the clearance between the opening 54 and the negative electrode power lead 23. This means that the adhesive sticker 51a does not need to be bonded to the bottom inner surface 2b of the battery case. However, the adhesive sticker 51a may be bonded to the negative electrode power lead 23.

The adhesive sticker 51 is temporarily retained at the negative electrode power lead 23 before the power generating unit 20 is placed inside the battery cell casing 2 and then is housed in the battery cell casing 2 together with the power generating unit 20.

As the non-aqueous electrolyte 5 comes in contact with the adhesive layer 53a of the adhesive sticker 51a disposed inside the battery cell container 4 as described above, the foreign matter 29 mixed in the non-aqueous electrolyte 5 is caught and trapped at the adhesive layer 53a.

It is to be noted that in the description given above in reference to FIGS. 6 and 7, the negative electrode power lead 23 is inserted through the opening 54 in the adhesive sticker 51. However, for example, the negative electrode current collecting member 21, which does not need a negative electrode power lead and has a cap-shaped top for contacting the bottom of the battery cell casing 2, though this is not shown in the figures, may be directly welded to the bottom inner surface 2b of the battery cell casing 2. In such a case, the winding core 15 together with such a negative electrode current collecting member should be inserted through the opening 54 in the adhesive sticker 51.

In addition, while the above described embodiments are achieved by using an adhesive tape or a sticker, it should be also accepted that a liquid adhesive compound may be deposited onto the negative electrode power lead 23, the negative electrode current collecting member 21, the ring-shaped holding member 22, the negative leads 17 and the side surface of the battery cell casing 2 as well as the bottom surface so as to form an adhesive layer.

(Embodiment 5)

Figure 8:
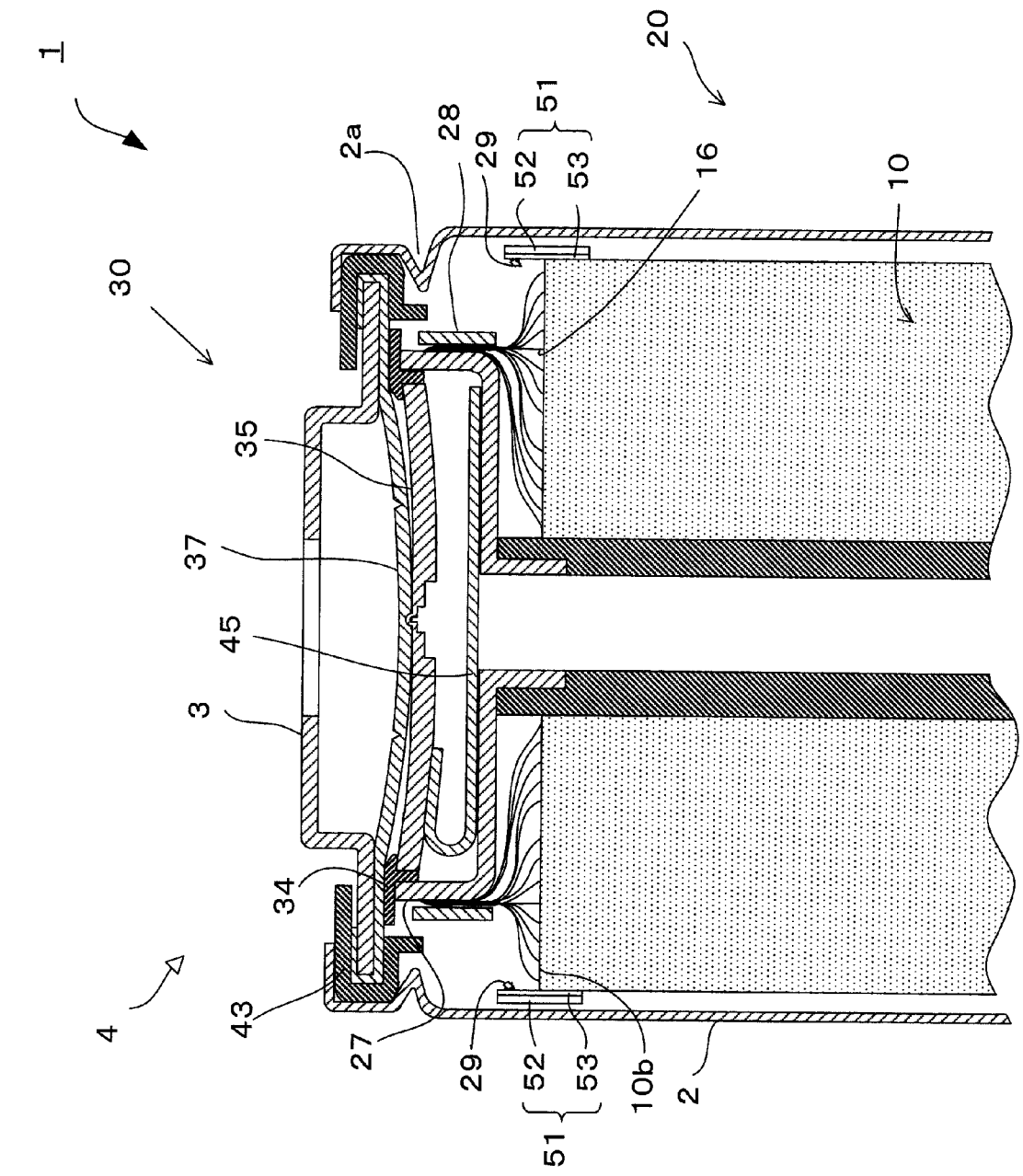
FIG. 8 is an enlarged sectional view of the essential structure of the secondary battery cell achieved in embodiment 5 of the present invention.

FIG. 8 is a sectional view showing the structure adopted in the adhesive layer 53 to be housed inside the battery cell container 4 in embodiment 5 of the secondary battery cell according to the present invention.

In the above described embodiments 1 through 4, the adhesive layer 53 or 53a of the adhesive tape 51 or of the adhesive sticker 51a is disposed near the bottom of the battery cell casing 2. The adhesive tape 51 in embodiment 5, in contrast, is disposed on the upper side of the battery cell casing 2.

More specifically, the adhesive layer 53 of the adhesive tape 51 is bonded to the electrode group 10, with the adhesive layer 53 turned toward the electrode group 10 and a side of the adhesive tape 51 along its width projecting out beyond a side portion 10b located on the upper side of the electrode group 10 in its axial direction. This adhesive tape 51 is similar to that in embodiment 1 in that it is constituted with a base film 52 and the adhesive layer 53 formed on the base film 52 and that it encircles the electrode group 10 along the outer circumferential surface of the electrode group 10 substantially over a full turn.

The non-aqueous electrolyte 5 does not necessarily fill the entire inner volume of the battery cell casing 2. However, the cylindrical secondary battery cell 1 having been manufactured is bound to be tilted at a large angle or turned sideways or upside down while it is being moved, transported or stored in a storage container. For this reason, the non-aqueous electrolyte 5 is bound to come into contact with the adhesive layer 53 of the adhesive tape 51 disposed on the upper side of the battery cell container 4, as shown in FIG. 8, and the foreign matter 29 mixed in the non-aqueous electrolyte 5 will be caught and trapped at the adhesive layer 53.

The cylindrical secondary battery cell 1 shown in FIG. 8 may be manufactured through a method similar to that described in reference to embodiment 1. Namely, the cylindrical secondary battery cell 1 may be manufactured by bonding the adhesive tape 51 to the electrode group 10 with a side portion of the adhesive tape 51 along the width thereof allowed to project out beyond the side portion 10b at the outermost circumference of the electrode group 10 in its axial direction on the upper side, before the power generating unit 20 is placed into the battery cell casing 2.

(Embodiment 6)

Figure 9:
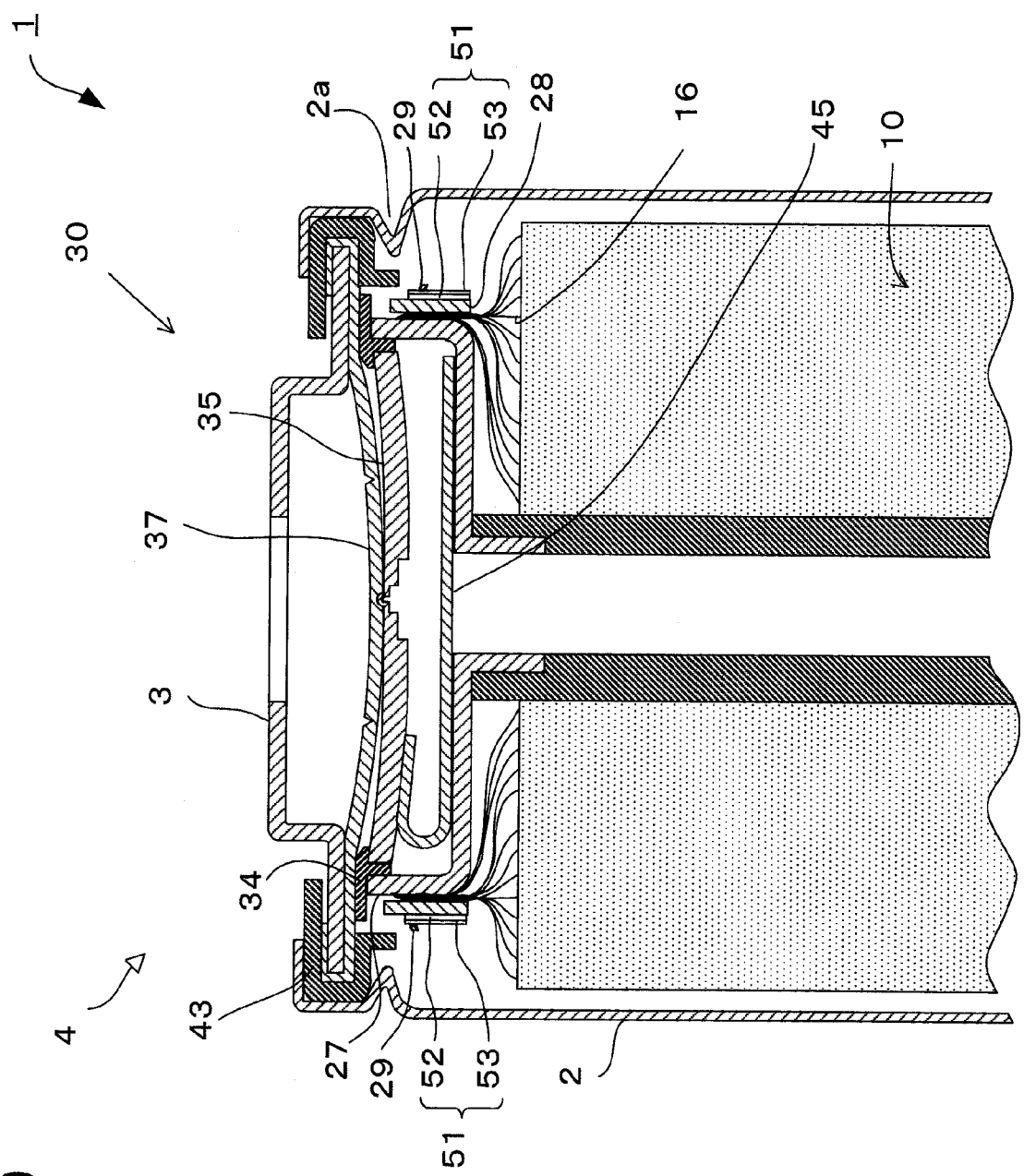
FIG. 9 is an enlarged sectional view of the essential structure of the secondary battery cell achieved in embodiment 6 of the present invention.

FIG. 9 is a sectional view showing the structure adopted in the adhesive layer 53 to be housed inside the battery cell container 4 in embodiment 6 of the secondary battery cell according to the present invention.

The adhesive tape 51 in embodiment 6 is wound substantially over a full turn on the outer circumferential surface of the ring-shaped holding member 28 that is bonded to the positive leads 16, which are further welded to the upper cylindrical portion 27c of the positive electrode current collector member 27. The adhesive tape 51 is wound on the outer circumferential surface of the holding member 28, directing the width direction of the base film 52 of the adhesive tape 51 to the axial direction of the holding member 28. At the end of a full winding turn, the terminating end of the base film 52 is bonded to the adhesive layer 53 by overlaying the terminating end of the base film over the adhesive layer 52 on the starting end side so as to achieve a ring shape.

The adhesive layer 53 of the adhesive tape 51 shown in FIG. 9 is exposed toward the non-aqueous electrolyte 5. Thus, as the cylindrical secondary battery cell 1 having been manufactured is tilted at a large angle or turned sideways or upside down while being moved transported or stored in a storage container, the adhesive tape will come into contact with the non-aqueous electrolyte 5 and the foreign matter 29, mixed in the non-aqueous electrolyte 5, will be caught and trapped at the adhesive layer 53. In addition, while the embodiment is achieved by using an adhesive tape, a liquid adhesive compound may be applied onto the positive electrode current collecting member 27, the negative electrode current collecting member 21, the ring-shaped holding member 28, the positive leads 16, the upper side surface of the battery cell casing 2, the inner surface of the lid unit located inside the battery cell container and the gasket to form an adhesive layer.

While embodiments 1 through 6 described above are achieved by adopting the secondary battery cell according to the present invention in a cylindrical secondary battery cell, the secondary battery cell according to the present invention may be adopted also in a prismatic secondary battery cell. The following is a description of an embodiment achieved by adopting the present invention in a prismatic secondary battery cell.

(Embodiment 7)

Figure 10:
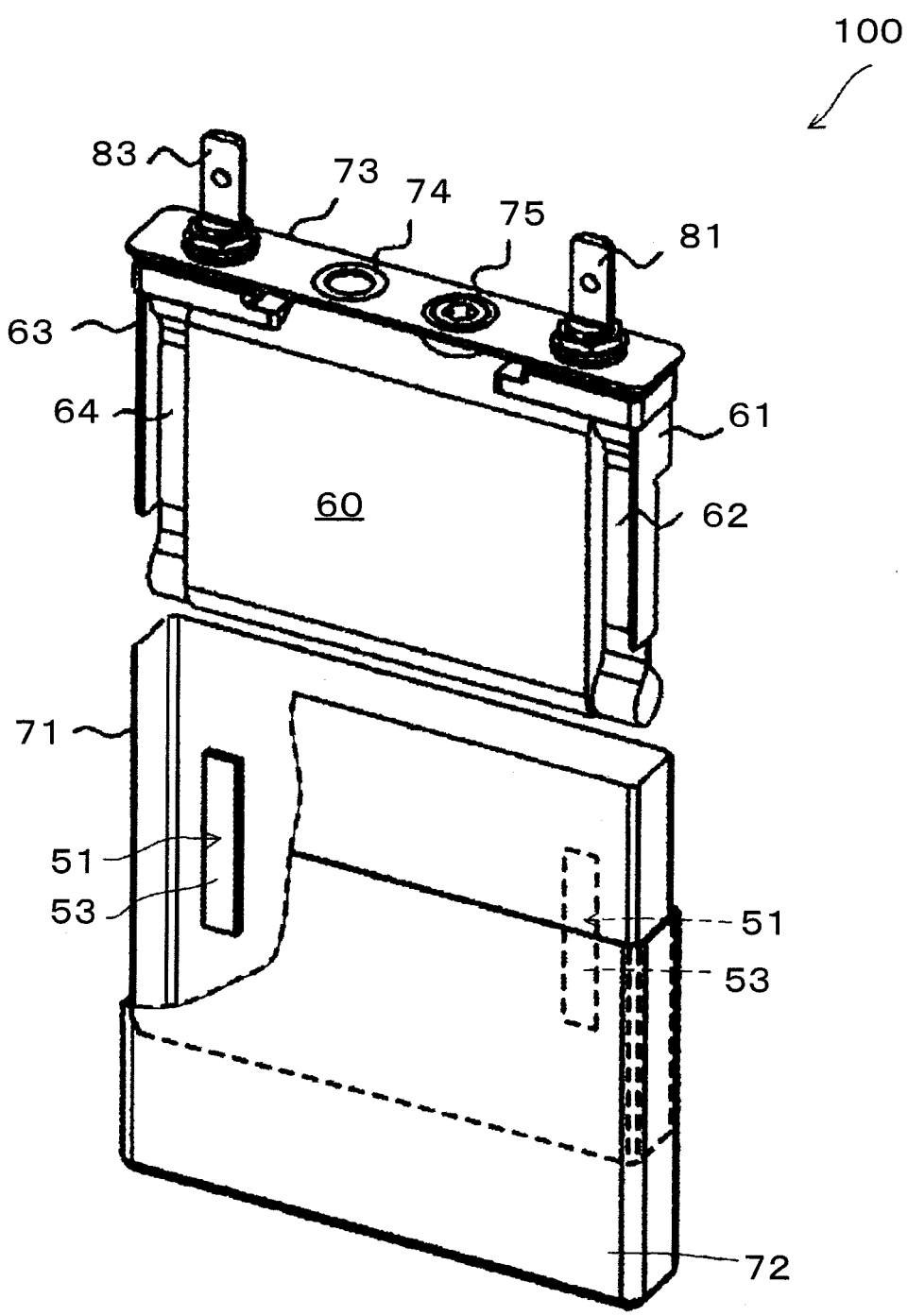
FIG. 10 is a perspective of a prismatic secondary battery cell achieved in embodiment 7 of the secondary battery cell according to the present invention.

FIG. 10 is an exploded perspective, presenting an external view of the lithium ion prismatic secondary battery cell according to the present invention.

The prismatic lithium ion secondary battery cell 100 is manufactured by housing a wound electrode group 60 shielded inside an insulating sleeve 71 inside a battery case 72. The wound electrode group 60 is formed by sequentially layering and winding a negative electrode sheet, a first separator sheet, a positive electrode sheet and a second separator sheet, as has been described in reference to embodiment 1. However, while the electrode group in embodiment 1 is formed by winding these members around the winding core 15, the wound electrode group 60 in the prismatic lithium secondary battery cell is formed in a flat configuration so as to form a circular arc portion at each of the two ends thereof.

A bonding portion 62 of an aluminum positive electrode power lead member 61 is bonded to a positive electrode mixture untreated portion of the prismatic lithium ion secondary battery cell through ultrasonic welding. The positive electrode mixture untreated portion of the wound positive electrode 60 is overlaid around its central region of the height direction of the wound electrode group 60 (the right side portion of the wound electrode group 60 in FIG. 10), and welded in its thickness direction. As the thickness of the positive electrode mixture untreated portion is less than that of the positive electrode mixture treated area, the area where the positive electrode mixture untreated portion is welded becomes sunken from the outer circumferential surface of the wound electrode group 60, when they are welded in the thickness direction of the wound electrode group, as shown in FIG. 10. While the rear surface side of the wound electrode group 60 is not shown in FIG. 10, the positive electrode mixture untreated portion is likewise set lower than the outer circumferential surface of the electrode winding pack 60 on the rear surface side. It should be noted that in case of a prismatic battery cell there are no such positive leads protruding from the positive electrode mixture untreated portion as described above for the cylindrical battery cell, and that the positive electrode mixture untreated portion is extending more outside than the separator in the width direction of the wound electrode group 60 in FIG. 10 (i.e. to the right hand side thereof, in winding axis direction). Additionally, it should be noted that in both ends with circular arc portion of the wound electrode group in its height direction, the positive electrode mixture untreated portion is not welded thus showing a cylindrical shape of the positive electrode mixture untreated portion on the right side of the wound electrode group 60, which structure allows the non-aqueous electrolyte to enter inside the wound electrode group 60.

A bonding portion 64 of a copper negative electrode power lead member 63 is bonded to a negative electrode mixture untreated portion of the wound electrode group 60 through ultrasonic welding. The negative electrode mixture untreated portion of the wound electrode group 60 is overlaid around its central region of the height direction of the wound electrode group 60 (the right side portion of the wound electrode group 60 in FIG. 10), and welded in its thickness direction. As the thickness of the negative electrode mixture untreated portion is less than that of the negative electrode mixture treated area, the area where the negative electrode mixture untreated portion is welded becomes sunken from the outer circumferential surface of the wound electrode group 60, as shown in FIG. 10. While the rear surface side of the wound electrode group 60 is not shown in the figure, the negative mixture untreated portion is set lower than the outer circumferential surface of the electrode winding pack 60 on the rear surface side, as well. It should be noted that, as well as in the case of above explained connection of the positive electrode power lead member 61, there are no such negative leads protruding from the negative electrode mixture untreated portion as described above for the cylindrical battery cell, and that the negative electrode mixture untreated portion is extending more outside than the separator in the width direction of the wound electrode group 60 in FIG. 10 (i.e. to the left hand side thereof, in winding axis direction). Additionally, it should be noted that in both ends with circular arc portion of the wound electrode group in its height direction, the negative electrode mixture untreated portion is not welded thus showing a cylindrical shape of the negative electrode mixture untreated portion on the left side of the wound electrode group 60, which structure allows the non-aqueous electrolyte to enter inside the wound electrode group 60.

The power lead members 61 and 63 are respectively connected to a positive terminal 81 and a negative terminal 83 disposed at a battery cell lid 73. Via the battery cell lid 73, which supports the electrode winding pack 60, charge/discharge through the positive terminal 81 and the negative terminal 83 is enabled.

An electrolyte filling port 74, through which the case is filled with electrolyte, is provided in the battery cell lid 73. In addition, a gas fracture valve 75, via which the internal pressure, having risen to a level exceeding a reference value is released, is disposed at the battery cell lid 73. The electrolyte filling port 74 is sealed through laser welding once the case has been filled with electrolyte. The battery case 72 is sealed by welding the battery cell lid 73 onto the battery case 72 through laser welding.

The non-aqueous electrolyte may be prepared by dissolving lithium hexafluoro-phosphate (LiPF6), so as to achieve a 1 mol/liter concentration, into a mixed solution of ethylene carbonate and dimethyl carbonate mixed at a volume ratio of 1:2.

The positive electrode is manufactured by mixing an active positive electrode material constituted of lithium-containing compound metal oxide powder, an electrically conductive material constituted of flaky graphite and a binder constituted of polyvinylidene fluoride (PVDF), adding a dispersal solvent constituted of N-methylpyrrolidone (NMP) to the mixture, thoroughly kneading the mixture into a slurry and applying the slurry onto both surfaces of an aluminum foil with a thickness of 20 μm.

Subsequently, the slurry is left to dry and the aluminum foil is pressed and cut out to obtain a positive electrode assuming a width of 80 mm, a thickness of 100 μm and a length of 4 m over the area where the active material mixture layer is present.

The negative electrode is manufactured by mixing together an active negative electrode material constituted of amorphous carbon powder and a binder constituted of PVDF, adding a dispersal solvent constituted of NMP into the mixture, kneading the mixture thoroughly into a slurry and applying the slurry onto both surfaces of a rolled copper foil with a thickness of 10 μm.

Subsequently, the slurry is left to dry and the copper foil is pressed and cut out to obtain a negative electrode assuming a width of 84 mm and a length of 4.4 m over the area where the active material mixture layer is present.

FIG. 10 shows the insulating sleeve 71 with part thereof cut away. An adhesive tape 51 is disposed on each of two lateral sides at one surface of the insulating sleeve 71, which faces opposite the wound electrode group 60. One of the adhesive tapes 51 is set at a position facing opposite the positive electrode mixture untreated portion. The other adhesive tape 51 is set at a position facing opposite the negative electrode mixture untreated portion. The adhesive tapes 51 each include a base film and an adhesive layer 53, as does the adhesive tape 51 achieved in embodiment 1. The adhesive tapes 51 are each disposed with the base film thereof turned toward the insulating sleeve 71 and the adhesive layer 53 thereof turned toward the wound electrode group 60.

The non-aqueous electrolyte 5, poured into the insulating sleeve 71 through the electrolyte filling port 74, does not necessarily fill the entire inner volume of the insulating sleeve 71. However, the prismatic lithium secondary battery cell 100 having been manufactured is bound to be tilted at a large angle or turned sideways or upside down while it is being moved, transported or stored in a storage container. The non-aqueous electrolyte 5 is thus bound to come into contact with the adhesive layers 53 of the adhesive tapes 51 and the foreign matter 29 mixed in the non-aqueous electrolyte will be caught and trapped at the adhesive layers 53. In addition, even though the adhesive layers in an electric vehicle with a secondary battery cell according to the present invention installed therein do not come in contact with the electrolyte in a stationary state, the electrolyte is bound to move and come into contact with the adhesive layers as the vehicle vibrates in the operating state. The foreign matter in the electrolyte will thus be trapped in the adhesive layers.

The adhesive tapes 51 may not necessarily be bonded onto the insulating sleeve 71 if the adhesive tapes 51 are arranged so that they do not move freely. In addition, the adhesive tapes 51 may or may not be constituted with an adhesive layer 53 alone. Furthermore, it is apparent that an adhesive tape 51 or an adhesive layer 53 may be disposed at a position other than the position corresponding to the positive electrode mixture untreated portion or the negative electrode mixture untreated portion.

The secondary battery cell according to the present invention described above includes an adhesive layer disposed in an exposed state so as to come into contact with the electrolyte. As a result, foreign matter mixed in the electrolyte is caught and trapped at the adhesive layer.

Consequently, entry of foreign matter mixed in the electrolyte through the gap between the positive electrode and a separator to result in internal short-circuiting can be effectively prevented.

It is to be noted that while the embodiments described above are each achieved by adopting the present invention in a lithium ion secondary battery cell, the present invention is not limited to this example and it may be adopted in a secondary battery cell that uses a water-soluble electrolyte, as in a nickel hydrogen battery cell, a nickel cadmium battery cell or a lead storage battery.

Moreover, the secondary battery cell according to the present invention allows for numerous modifications without departing from the scope of the invention, as long as the secondary battery cell achieved by placing an electrode group made up with a positive electrode and a negative electrode and an electrolyte inside a battery cell container from the outside and then sealing the battery cell container, is characterized in that an adhesive layer for trapping foreign matter present inside the battery cell container is disposed in the battery cell container by exposing at least part of the adhesive layer so as to allow the adhesive layer to come into contact with the electrolyte.

The above described embodiments are examples and various modifications can be made without departing from the scope of the invention.

What is claimed is:

1. A secondary battery, comprising:
    an electrode group that includes a positive electrode, a negative electrode, and a lower portion containing negative electrode leads projecting therefrom,
    an electrolyte,
    a battery cell container that contains the electrode group and the electrolyte and that is sealed, and
    an adhesive layer disposed in the battery cell container, the adhesive layer comprising an exposed portion, wherein:
    the exposed portion of the adhesive layer is in contact with a portion of the electrolyte disposed between the lower portion of the electrode group and the battery cell container.

2. A secondary battery cell according to claim 1, wherein:
    at least part of the adhesive layer disposed inside the battery cell container is bonded to the electrode group; and
    the exposed portion of the adhesive layer projects out beyond the lower side portion of the electrode group.

3. A secondary battery cell according to claim 2, wherein:
    the electrode group includes a separator disposed between the positive electrode and the negative electrode; and
    the adhesive layer disposed inside the battery cell container is bonded to the separator wound on an outermost circumferential side.

4. A secondary battery cell according to claim 1, wherein:
    the electrode group includes a winding core around which the positive electrode and the negative electrode are wound;
    the battery cell container includes a bottom surface ranging perpendicular to an axis of the winding core; and
    the adhesive layer disposed inside the battery cell container is positioned between a side of the battery cell group, which faces opposite the bottom surface of the battery cell container, and the bottom surface of the battery cell container.

5. A secondary battery cell according to claim 4, wherein:
    the adhesive layer includes an opening through which the winding core is inserted.

6. A secondary battery cell according to claim 1, wherein:
    the battery cell container comprises a battery cell container in which the electrode group is housed and a lid unit disposed at an opening portion of the battery cell container; and
    the adhesive layer disposed inside the battery cell container is positioned between a side of the electrode group, which faces opposite the lid unit, and the lid unit.

7. A secondary battery cell according to claim 1, further comprising an insulating sleeve for housing the electrode group, wherein:
    the adhesive layer disposed inside the battery cell container is housed inside the insulating sleeve.

8. A secondary battery cell according to claim 1, wherein:
    the electrolyte is a non-aqueous electrolyte.

9. A secondary battery cell according to claim 2, wherein:
    the electrolyte is a non-aqueous electrolyte.

10. A secondary battery cell according to claim 3, wherein:
    the electrolyte is a non-aqueous electrolyte.

11. A secondary battery cell according to claim 4, wherein:
    the electrolyte is a non-aqueous electrolyte.

12. A secondary battery cell according to claim 5, wherein:
    the electrolyte is a non-aqueous electrolyte.

13. A secondary battery cell according to claim 6, wherein:
    the electrolyte is a non-aqueous electrolyte.

14. A secondary battery cell according to claim 7, wherein:
    the electrolyte is a non-aqueous electrolyte.

15. A secondary battery according to claim 2, wherein the adhesive layer is wound along an outer circumference of the electrode group, the adhesive layer encircling the electrode group.

16. A secondary battery according to claim 1, wherein the portion of the electrolyte the adhesive layer is in contact with is disposed between the negative electrode leads and the battery cell container.

17. A secondary battery according to claim 2, wherein the portion of the electrolyte the adhesive layer is in contact with is disposed between the negative electrode leads and the battery cell container.

* * * * *